US012093933B2

(12) United States Patent
Liberty et al.

(10) Patent No.: US 12,093,933 B2
(45) Date of Patent: *Sep. 17, 2024

(54) SYSTEM FOR DYNAMIC NETWORK AUTHENTICATION PROTOCOLS

(71) Applicant: VBN Holdings, LLC, Orlando, FL (US)

(72) Inventors: Michael A. Liberty, Orlando, FL (US); Mike Love, Austin, TX (US); Giovanni A. Dalmaso, Houston, TX (US); Ricardo Osvaldo Giovannone, Albiate (IT)

(73) Assignee: VBN Holdings, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,853

(22) Filed: May 15, 2023

(65) Prior Publication Data

US 2023/0289783 A1  Sep. 14, 2023

Related U.S. Application Data

(63) Continuation of application No. 17/335,901, filed on Jun. 1, 2021, now Pat. No. 11,687,919.

(60) Provisional application No. 63/036,309, filed on Jun. 8, 2020.

(51) Int. Cl.
  *G06Q 20/38* (2012.01)
  *G06Q 20/20* (2012.01)
  *H04L 9/40* (2022.01)

(52) U.S. Cl.
  CPC ......... *G06Q 20/3821* (2013.01); *G06Q 20/20* (2013.01); *H04L 63/0884* (2013.01)

(58) Field of Classification Search
  None
  See application file for complete search history.

(56) References Cited

U.S. PATENT DOCUMENTS

| 9,721,147 | B1 | 8/2017 | Kapczynski |
| 2003/0033526 | A1 | 2/2003 | French et al. |
| 2010/0121701 | A1 | 5/2010 | Nguyen et al. |
| 2011/0131627 | A1 | 6/2011 | Abendroth et al. |
| 2012/0158585 | A1 | 6/2012 | Ganti |
| 2015/0038208 | A1 | 2/2015 | Fotevski |

(Continued)

OTHER PUBLICATIONS

International Search Report and Written Opinion received for PCT Patent Application No. PCT/US21/035955, mailed on Sep. 8, 2021, 2 pages.

*Primary Examiner* — Joseph W. King
(74) *Attorney, Agent, or Firm* — Workman Nydegger

(57) ABSTRACT

A system for implementing and managing network-based, variable authentication protocols receives information relating to a digital monetary transaction. Additionally, the system accesses an initial authentication protocol dataset. The system also generates a variable authentication protocol dataset. The system then communicates the variable authentication protocol dataset to the point-of-sale computer system. The system also receives, from the point-of-sale computer system, authentication tokens. Further, the system validates the authentication tokens in view of the variable authentication protocol dataset. Further still, in response to the validation of the authentication tokens, the system processes the digital monetary transaction.

16 Claims, 5 Drawing Sheets

(56) References Cited

U.S. PATENT DOCUMENTS

| | | |
|---|---|---|
| 2017/0017957 A1* | 1/2017 | Radu .................. G06Q 20/4012 |
| 2019/0058992 A1 | 2/2019 | Kurian et al. |
| 2019/0097812 A1 | 3/2019 | Toth |
| 2021/0342841 A1 | 11/2021 | Pham et al. |
| 2021/0383374 A1 | 12/2021 | Liberty et al. |

* cited by examiner

Mobile Computing Device 110

SYSTEM FOR DYNAMIC NETWORK AUTHENTICATION PROTOCOLS

CROSS-REFERENCE TO RELATED APPLICATIONS

This application is a continuation of U.S. application Ser. No. 17/335,901 filed on Jun. 1, 2021, entitled "SYSTEM FOR DYNAMIC NETWORK AUTHENTICATION PROTOCOLS," which application claims the benefit of and priority to U.S. Provisional patent application Ser. No. 63/036,309 filed on 8 Jun. 2020 and entitled "SYSTEM FOR DYNAMIC NETWORK AUTHENTICATION PROTOCOLS." All of the aforementioned applications are expressly incorporated herein by reference in their entirety.

BACKGROUND

From the early days of computing, computer systems have had a tremendous impact on the financial and banking markets. The arrival of computers allowed banking and stock markets to move to a digital format that greatly increased the speed and accuracy with which transactions could be performed. Additionally, computers have allowed consumers to move to a cashless society where the vast majority of monetary transactions take place without any physical money changing hands.

Computer technologies also allowed distant markets to be connected through new and greatly improved systems. For example, money can now be quickly and easily transferred from a bank branch in a particular state or country to a bank branch in another state or country. Using some of these same technologies, money has become increasingly digital in nature.

This move towards digital currency and extra-jurisdictional transactions has had a beneficial impact on economic activity around the world. However, there are still many technological issues outstanding relating to the efficient and secure movement of monetary funds.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments comprise a system for implementing and managing network-based, variable authentication protocols. The system receives, from a point-of-sale computer system, information relating to a digital monetary transaction. Additionally, the system accesses, at the remote variable authentication protocol server, an initial authentication protocol dataset. The initial authentication protocol dataset comprises at least a first authentication protocol associated with the identification associated with the point-of-sale computer system, a second authentication protocol associated with the location information relating to the point-of-sale computer system, and a third authentication protocol associated with the information relating to the digital monetary transaction. The system also generates, at the remote variable authentication protocol server, a variable authentication protocol dataset. Generating the remote variable authentication protocol dataset comprises removing from the initial authentication protocol dataset any of the first authentication protocol, the second authentication protocol, or the third authentication protocol that are superseded by another authentication protocol within the initial authentication protocol dataset.

In addition, the system communicates the variable authentication protocol dataset to the point-of-sale computer system. The system also receives, from the point-of-sale computer system, authentication tokens. Further, the system validates the authentication tokens in view of the variable authentication protocol dataset. Further still, in response to the validation of the authentication tokens, the system processes the digital monetary transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

Disclosed embodiments include systems and methods for managing multiple different authentication protocols across multiple different entities. For example, at least one embodiment provides a server that manages various different, overlapping, and potentially conflicting authentication protocols related to financial transactions. For instance, an individual may wish to perform a particular financial transaction from within a specific country. The financial transaction may include any type of transaction, such as, but not limited to, spending money, receiving a loan, opening a bank account, or exchanging currency. This transaction may implicate a number of different authentication protocols that are dictated by one or more of the local governments, the national government, the banking institution involved in the transaction, and the type of transaction. As used herein, an "authentication protocol" comprises a rule or set of rules dictating the types of documents required for a user to prove their identity or attributes about their identity.

Managing these various authentication protocols is not only a time consuming and inefficient process, it also creates the potential for security risks. In many cases, these authentication protocols require that the client provide sensitive identification information. If this identification information is obtained by a bad actor, that bad actor may be able to leverage the information to gain access to the client's financial accounts and other personal records. In at least one embodiment disclosed herein, systems and methods are described that significantly increase the efficiency and speed of implementing the correct authentication protocols, while also significantly increasing the safety of a client's personal information and the control that the client has over that information.

Figure 1:
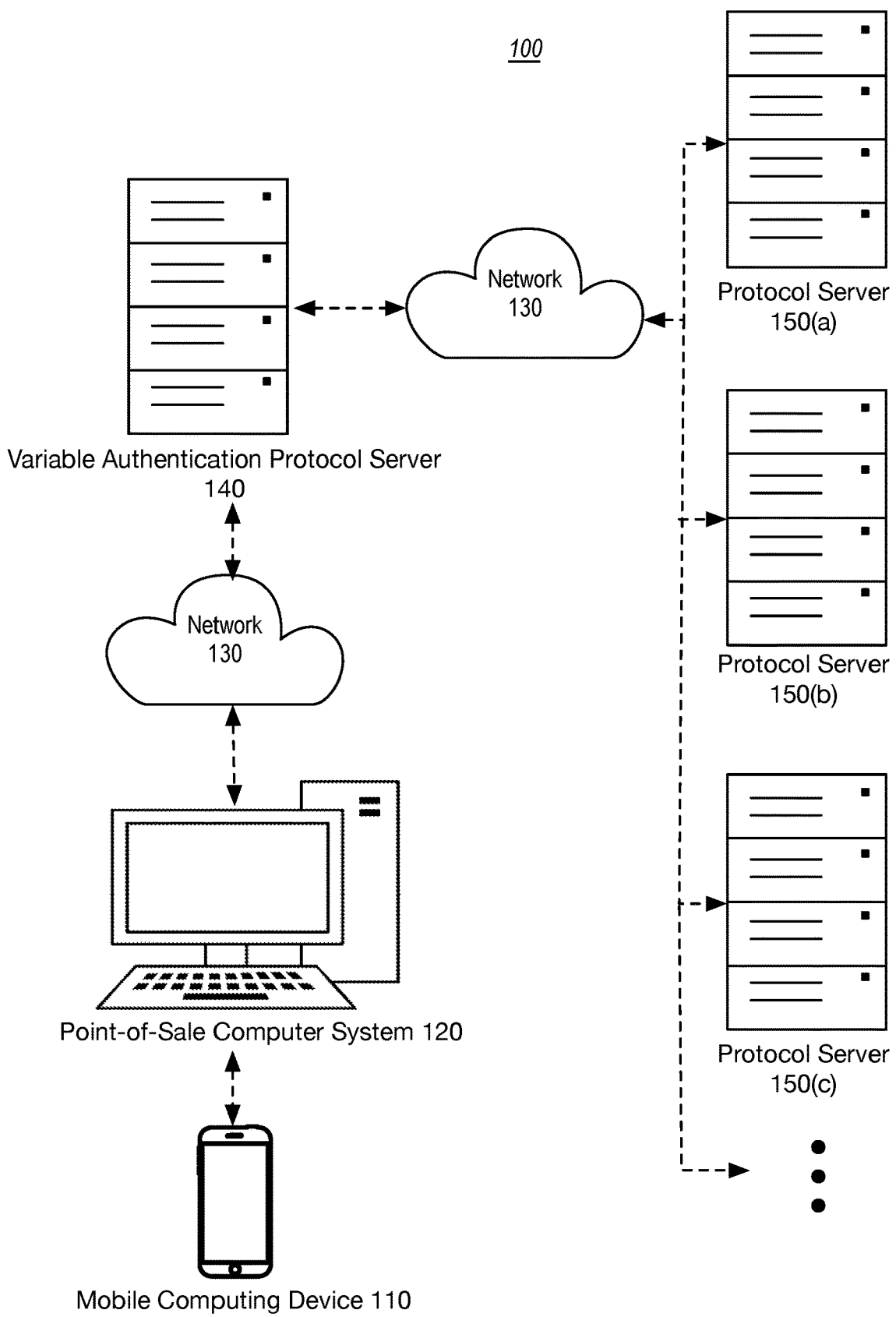
FIG. 1 illustrates a schematic diagram of a system for implementing and managing network-based, variable authentication protocols.

Turning now to the figures, FIG. 1 illustrates a schematic diagram of a system 100 for implementing and managing network-based, variable authentication protocols. The system 100 comprises a mobile computing device 110, a point-of-sale (POS) computer system 120, a variable authentication protocol server 140, and various protocol servers 150(a-c). The POS computer system 120 is in communication with the variable authentication protocol server 140 through a network 130. Additionally, the variable authentication protocol server 140 is in communication with the various protocol servers 150(a-c) through the same network 130 or through a different network. In the depicted case, the network 130 represents the Internet through which the various computers and servers may communicate.

In at least one embodiment, the mobile computing device 110 is a client owned device. The client may carry the mobile computing device 110 into a physical store location where a POS computer system 120 is located. The physical store location may comprise a bank branch, or in some embodiments may comprise a third-party store location that has joined a common monetary transaction network that is operated by system 100. In at least one embodiment, the POS computer system 120 may comprise a standalone, self-service device that is not necessarily associated with a store or bank branch. Additionally, in at least one embodiment, the POS computer system 120 may comprise virtual aspects such that the POS computer system 120 may be executed in whole or in part on any of a mobile computing device 110, a physical POS computer system 120, and/or a variable authentication protocol server 140.

The client may express an interest in performing a financial transaction through the POS computer system 120. For instance, the client may wish to open a savings account with a banking institution that is also participating in the common monetary transaction network that is operated by system 100. Due to modern regulatory and security requirements, such as Know-Your-Client (KYC) regulations, the client will need to meet specific authentication protocols, such as providing specific evidence of his or her identity.

The onerous authentication protocols for verifying the client's identification can present an obstacle to a smooth onboarding of the client into the bank's systems. For example, the bank may require specific authentication protocols in the form of specific evidence of the client's identification, including for example that client's birth certificate. In contrast, the local governing regulations over the location of the third-party store may require government issued photo identification. Similarly, the operator of the system 100 may require evidence that the client is over the age of 18. Each of the exemplary requirements present an obstacle to allowing the client to open up a bank account. Further, each of these pieces of sensitive identification information from the client comprises a security risk if they are not handled carefully.

Accordingly, disclosed embodiments utilize a self-sovereign identity (SSI) system that allows a user to control their own personal sensitive identification information and to share the minimum amount of sensitive identification information needed to meet a given security protocol. As used herein, an SSI system comprises any digital system that allows a user to maintain control over his or her own personal information. The SSI system comprises "claims" that are supported by digital "proofs" which include things such as digital copies of birth certificates, digital copies or driver licenses, or other forms of digitized identification information. The SSI system further comprises digital "attestations" which include cryptographically signed claims. As used herein, a "claim" comprises a piece of information that the client asserts, often through his or her SSI. For example, the client may claim to have been born on May 28, 1981, within the state of California. The State of California may provide a government function of providing this birthdate and birth location within a known format and then cryptographically signing the information so that a third party can cryptographically validate that the information is correct.

Returning to our example, the client's request to open a savings account causes the POS computer system 120 to receive a digital request to perform the digital monetary transaction. In response, the POS computer system 120 communicates to the remote variable authentication protocol server 140 information relating to the digital monetary transaction, the identification associated with the POS computer system 120, and the location information relating to the POS computer system 120. The POS computer system 120 also sends an inquiry to the variable authentication protocol server 140 requesting the proper authentication protocols for opening the savings account for the client. Accordingly, the variable authentication protocol server 140 receives, from the point-of-sale computer system 120, information relating to a digital monetary transaction (in this case a request to open a savings account), an identification associated with a user, an identification associated with the POS computer system 120, and location information relating to the POS computer system 120. In some embodiments, the variable authentication protocol server 140 may be able to derive some of the received information. For example, the identification associated with the POS computer system 120 may allow the variable authentication protocol server 140 to determine the location information relating to the POS computer system 120.

Figure 2:
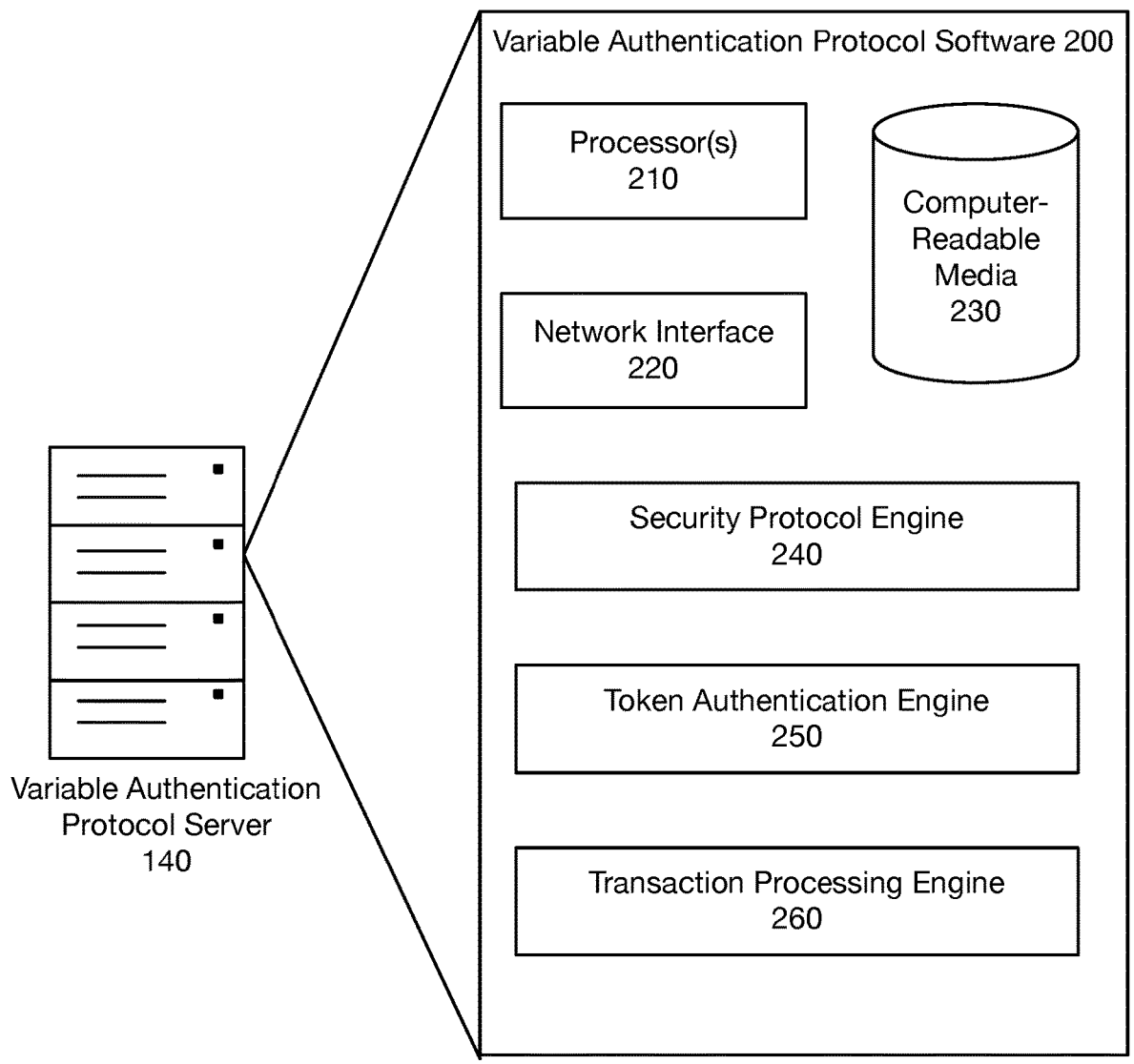
FIG. 2 illustrates a schematic diagram of a server in a system for implementing and managing network-based, variable authentication protocols.

FIG. 2 illustrates a schematic diagram of a variable authentication protocol server 140 in a system for implementing and managing network-based, variable authentication protocols. The depicted variable authentication protocol software 200 comprises various modules 240, 250, 260 that are in communication with one or more processor(s) 210, a network interface 220, and computer-readable media 230. As used herein, a "module" comprises computer executable code and/or computer hardware that performs a particular function. One of skill in the art will appreciate that the distinction between different modules is at least in part arbitrary and that modules may be otherwise combined and divided and still remain within the scope of the present disclosure. As such, the description of a component as being a "module" is provided only for the sake of clarity and explanation and should not be interpreted to indicate that any particular structure of computer executable code and/or computer hardware is required, unless expressly stated otherwise. In this description, the terms "component", "agent", "manager", "service", "engine", "virtual machine" or the like may also similarly be used.

The security protocol engine 240 is configured to access, at the remote variable authentication protocol server 140, an initial authentication protocol dataset. The initial authentication protocol dataset comprises at least a first authentication protocol associated with the identification associated with the POS computer system 120, a second authentication protocol associated with the location information relating to the POS computer system 120, and a third authentication protocol associated with the information relating to the digital monetary transaction. The first authentication protocol, the second authentication protocol, and the third authentication protocol may comprise sovereign identification requirements for specific proof and attestations.

As such, the security protocol engine 240 may be configured to identify a requirement for a proof of a particular claim within the first authentication protocol, the second authentication protocol, and/or the third authentication protocol. Similarly, the security protocol engine 240 may be configured to identify a requirement for an attestation of the particular claim within the first authentication protocol, the second authentication protocol, and/or the third authentication protocol.

By way of example and not limitation, the first authentication protocol associated with the identification associated with the POS computer system 120 may comprise authentication requirements that are specific to a company or organization that operates the POS computer system 120. Specifically, the remote variable authentication protocol server 140 may communicate with a protocol server 150(*a*) that is controlled by the third-party that operates the POS computer system 120. The protocol server 150(*a*) may provide a set of first authentication protocols that require that only individuals over the age of 18 are able to perform monetary transactions through their POS computer system 120. As such, the first authentication protocol may comprise a requirement that the client prove they are over the age of 18. Additionally, the first authentication protocol may indicate whether a display of a particular digital proof, such as a digital copy of a driver license with a birth date is sufficient, or whether an attestation that the client is over 18 is required.

Additionally, by way of example and not limitation, the second authentication protocol associated with the location information relating to the POS computer system 120 may require authentication protocols that are specific to international treaty obligations, national legal obligations, and local law obligations associated with jurisdictions encompassing the POS system 120. Specifically, the remote variable authentication protocol server 140 may communicate with a protocol server 150(*b*) that is controlled by the government bodies with jurisdiction over the POS system 120. The government bodies may have a number of different regulations and laws that are implicated based upon the type of monetary transaction the client wishes to perform, the amount of money involved in the monetary transaction, the parties involved in the monetary transaction, and various other similar attributes of the monetary transaction. For instance, the second authentication security protocol dictated by the government bodies may require that the client provide a government issued identification that verifies his or her identity. The second authentication security protocol may further indicate the type and level of government issued identification required. For example, a single digital proof of a valid passport may be sufficient. In contrast, if the client wishes to use a government issued driver's license to verify his or her identification, the driver's license may be required to be associated with an attestation or with a second digital proof such as a valid birth certificate. As such, the various authentication protocols may allow for a dynamic collection of different attestations or digital proofs based upon the specific requirements of the security protocol.

Further, by way of example and not limitation, the third authentication protocol associated with the information relating to the digital monetary transaction may comprise specific authentication protocols enacted by the bank or financial entity that is facilitating the monetary transaction and/or authentication requirements that are specific to the type of monetary transaction that is being processed. The information relating to the digital monetary transaction may include the bank or financial institution that is facilitating the monetary transaction, the amount of money involved in the monetary transaction, the type of monetary transaction, or various other similar information. The remote variable authentication protocol server 140 may communicate with a protocol server 150(*c*) that is controlled by the bank or financial entity.

In one example, the third authentication security protocol may require further information verifying both the client's age and identification. For instance, the bank or financial entity facilitating the monetary transaction may be subject to legal regulations and law within their own jurisdiction that dictate the information needed to verify the client's identification. Additionally, the required information may further be dictated by the type and/or amount of money at issue in the transaction. For instance, if the monetary transaction involves more than $10,000, the third authentication protocol may require additional information or an attestation of the information instead of a simple digital proof.

Accordingly, each of the first authentication protocol, the second authentication protocol, and the third authentication protocol may comprise a different list of required proofs and attestations. Once the security protocol engine 240 accesses the initial authentication protocol dataset, the security protocol engine 240 generates a remote variable authentication protocol dataset. In at least one embodiment, generating the remote variable authentication protocol dataset comprises removing from the initial authentication protocol dataset any of the first authentication protocol, the second authentication protocol, or the third authentication protocol that are superseded by another authentication protocol within the initial authentication protocol dataset. In particular, the security protocol engine 240 analyzes the various authentication protocols identified previously and identifies areas where the protocols overlap or are redundant with each other.

For example, the security protocol engine 240 may institute a hierarchy within the authentication protocols such that an attestation of a claim supersedes a proof of the claim. In other words, an attestation of a client's birth certificate is considered better than a digital proof of the client's birth certificate. Accordingly, the security protocol engine 240 can identify that the first authentication protocol requires a digital proof of the client's birth certificate, while the second authentication protocol requires an attestation of the client's birth certificate. In this case, the security protocol engine 240 can determine that it is not necessary for the client to provide the digital proof, because the client is required to provide an attestation of the birth certificate, which is higher in the hierarchy. Though, in some cases, a particular security protocol may expressly require a digital proof and expressly disallow the substitution of an attestation. This situation may arise, for example, if the government authority providing the attestation is not recognized by the provider of the particular security protocol.

Additionally, the security protocol engine 240 may map different types of authentication protocols to each other. For example, the security protocol engine 240 may create categories of authentication protocols that are structured within a hierarchy. In particular, the security protocol engine 240 may identify more specific information as being higher in the hierarchy than more general information. For example, the second authentication protocol may require proof that the client is over the age of 18. In contrast, the third authentication protocol may require proof of the client's birthdate. The security protocol engine 240 is configured to identify that the client's birthdate is more specific information than the binary determination that the client is over the age of 18. In particular, once the client's birthdate is verified, it is trivial to determine whether the client is over the age of 18. In such a circumstance, the security protocol engine 240 may determine that it is not necessary for the client to separately validate both that he or she is over the age of 18th and his or her birthdate. Instead, the security protocol engine 240 may determine that providing a digital proof or attestation of the client's birthday is sufficient.

In at least one embodiment, each type of possible attestation and/or digital proof may be stored within security protocol engine 240. Additionally, each type of possible attestation and/or digital proof may be associated with metadata indicating the exact information and data that is provided by each type of possible attestation and/or digital proof. For instance, the security protocol engine may have metadata indicating the information available on every acceptable birth certificate or driver license. For instance, some jurisdictions may provide birthdates on drivers licenses while others may not.

Once the security protocol engine 240 had identified the variable authentication protocol dataset, the network interface 220 within the variable authentication protocol server 140 communicates the variable authentication protocol dataset to the POS computer system 120. The POS computer system 120 then requests the authentication protocols defined by the variable authentication protocol dataset from the mobile computing device 110.

The client is then provided with complete control over the process of authenticating his or her own identity. In particular, the mobile computing device 110 displays to the client each digital proof and attestation requested by the variable authentication protocol dataset. Additionally, the mobile computing device 110 displays each entity that will be provided with each digital proof or attestation. Further, in the case that the client can choose between different digital proofs or attestations, the mobile computing device 110 provides those options. For instance, the client may be able to authenticate his or her age by sharing an attestation of a birth certificate or by sharing a digital proof of his or her passport. In such a case, the mobile computing device 110 provides options for the client to choose whether to share the attestation of the birth certificate or the passport. Further, the client may indicate that only certain digital proofs or attestations can go to specific third parties. For example, the client may indicate that the digital proof of his or her passport can go to the bank or financial institution that is facilitating the monetary transaction, while the attestation of the birth certificate can go to the operator of the POS computer system 120.

Once the client indicates the desired digital proofs and/or attestations, the mobile computing device 110 communicates the desired digital proofs and/or attestations to the POS computer system 120. The desired digital proofs and/or attestations are communicated using an encryption technology such that the POS computer system 120 is only able to read the desired digital proofs and/or attestations that are directed to it. For example, when communicating the variable authentication protocol dataset to the mobile computing device 110, the variable authentication protocol dataset may comprise one or more public encryption keys associated with each authentication protocol. Each public encryption key may be associated with the entity, also referred to herein as a "third party", that is requesting the digital proof or attestation. As such, the mobile computing device 110 encrypts each desired digital proof and/or attestation with the associated public key so that only the specific entity that is requesting the information is able to read it.

The mobile computing device 110 can then send the desired digital proofs and/or attestations directly to the variable authentication protocol server 140 or through the POS computer system 120 to the variable authentication protocol server 140. Accordingly, the variable authentication protocol server 140 may receive, from the point-of-sale computer system 120, authentication tokens. As used herein, the "authentication tokens" comprise the digital proofs and/or attestations received from the mobile computing device 110 for the purpose of authenticating the clients' identity.

The token authentication engine 250 within the variable authentication protocol server 140 then validates the authentication tokens in view of the variable authentication protocol dataset. In at least one embodiment, the authentication process comprises the token authentication engine 250 communicating a received authentication token to the security protocol server 150(*a-c*) that requested the particular authentication token. The security protocol server 150(*a-c*) then authenticates the authentication token and sends a communication to the token authentication engine 250 indicating whether the authentication token was properly authenticated.

In contrast, in at least one embodiment, the token authentication engine 250 locally performs the authentication steps. For example, each acceptable digital proof or digital attestation may have a proof template stored within the computer-readable media 230. In the case of digital proofs, the proof template may comprise specific descriptions of the acceptable attributes of a particular digital proof. For instance, the computer-readable media 230 may store a digital proof template describing acceptable attributes of passports from a variety of different countries. The described attributes may be directed towards both informational aspects of the respective countries' passports (e.g., the location and format of the individual's name) and towards anti-counterfeit measures built into respective countries' passports (e.g., specific, difficult to reproduce features of a seal on the passport). Using these proof templates, the token authentication engine 250 is able to determine whether the received digital proof is valid and also to identify how the digital proof should be read.

Additionally, the computer-readable media 230 may also comprise a library of digital signature keys. Using the digital signature keys, the token authentication engine 250 can authenticate that a received attestation is authentic. For example, the token authentication engine 250 may access a key for a particular jurisdiction's birth certificates. The key may comprise a cryptographic key that is used to verify that a digitally signed piece of information is authentic. Using the key, the token authentication engine 250 can authenticate that received information that has been attested is authentic. For instance, the state of California may provide an attestation for a birth certificate. The attestation may take the form of the State of California taking a hash of a particular birth certificate, encrypting the hash with a private key, and then communicating the hash and the birth certificate to the mobile computing device 110 of the individual for their own storage. When the token authentication engine 250 wishes to authenticate the attestation of the birth certificate, the token authentication engine 250 can receive attestation, which in this case comprises the encrypted hash and the digital birth certificate. The token authentication engine 250 can then retrieve, from the computer-readable media 230, a public key associate with the State of California. The token authentication engine 250 uses the public key to decrypt the hash and then compares the hash to a hash of the digital birth certificate that is calculated locally by the token authentication engine 250. If the two hashes match, the token authentication engine 250 determines that the attestation is authentic and that the information within the birth certificate is likewise authentic.

In response to the validation of the authentication tokens, the transaction processing engine 260 processes the digital monetary transaction. The step of processing the digital monetary transaction may comprise sending the information necessary to a bank or financial institution to open a savings account. Additionally or alternatively, processing the digital monetary transaction may comprise instituting a loan, withdrawing money, transferring money, exchanging a foreign currency, or any number of other monetary transactions.

Once a client has been authenticated, the variable authentication protocol server 140 can send the mobile computing device 110 a digital signature that indicates that the identity of the client has been authenticated. The client may then be able to rely upon the digital signature for future monetary transactions, instead of reauthenticating himself or herself. Further, in at least one embodiment, the digital signature may be associated with data stored at the variable authentication protocol server 140 that indicates the specific information that was used to authenticate the client. In some cases, future monetary transactions may require the client to provide specific identification information. For instance, if the client is transferring funds worth more than $10,000, the authentication protocol may require that the client provide a specific type of personal identification. In such a case, the variable authentication protocol server 140 is able to verify through the client digital signature what documents were previously used to validate the client's identification. If the specific type of personal identification was previously authenticated, the variable authentication protocol server 140 can allow the monetary transaction to proceed. In contrast, if the specific type of personal identification was not previously authenticated, the variable authentication protocol server 140 can request the personal identification from the client.

Figure 3A:
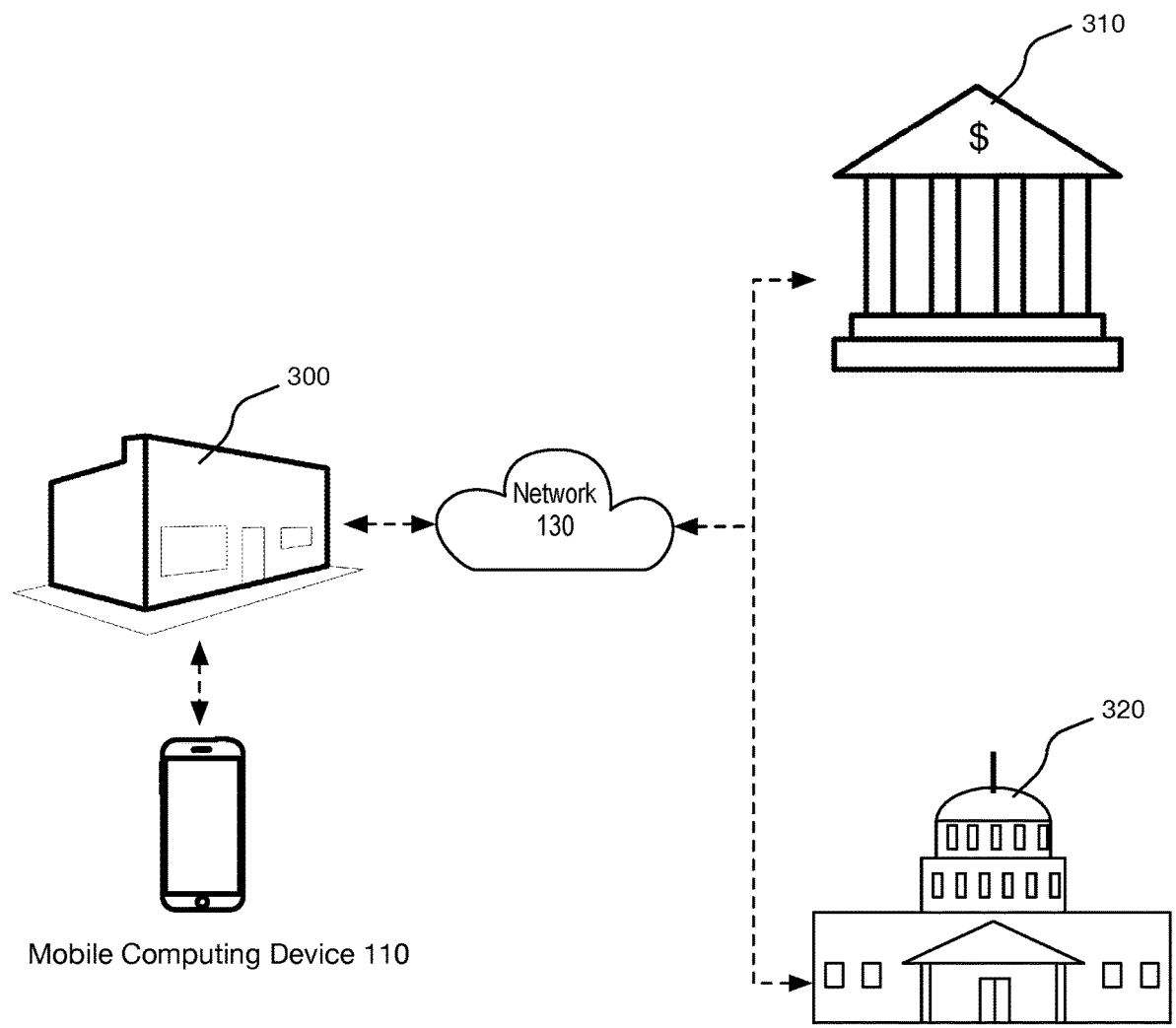
FIG. 3A illustrates a schematic diagram of a user authenticating at a third-party store.

FIG. 3A illustrates a schematic diagram of a user authenticating at a third-party store. In the depicted example, a user may apply for a new account at a third-party store 300. The third-party store 300 may be affiliated with one or more banking institutions 310. As such, a user may be able to open a new savings account, for example, at a third-party store. The user can then later deposit, withdraw, and otherwise manage money in the savings account through a cashier at the third-party store.

Upon receiving the user's request to apply for a new account, the third-party store 300 accesses, through network 130, the relevant authentication protocols from the banking institution 310 and the respective government authority 320. Additionally, the third-party store 300 may request authentication protocols from a corporate server or may access locally-stored authentication protocols associated with the third-party store 300. The authentication protocols may be processed at a point-of-sale system within the third-party store 300 or may be communicated directly to the mobile computing device 110 for processing.

In at least one embodiment, one or more of the authentication protocols from the banking institution 310 and/or the government authority 320 may require a geolocation validation. Specifically, the authentication protocol may require that both the third-party store 300 and the mobile computer device 110 each independently provide a geolocation token that indicates both of their respective locations. In at least one embodiment, the geolocation token is generated through the use of an encryption key or digital signature. For example, both the third-party store 300 and the mobile computing device 110 may digitally sign and/or encrypt their respective geolocation token prior to communicating the token to the banking institution 310 and/or the government authority 320. The banking institution 310 and/or the government authority 320 is then able to verify that the geolocation token was in fact generated by the third-party store 300 or the mobile computing device 110.

The authentication protocol may require that the two geolocation tokens be within a threshold distance of each other. Such a requirement may be useful in ensuring that the application for the new account is not fraudulent. Specifically, such an authentication protocol may prevent a bad actor from submitting a fraudulent account application without being physically present at the third-party store 300 with the mobile computing device 110.

In at least one embodiment, the mobile computing device 110 communicates through a point-of-sale system at the third-party store 300. For example, the point-of-sale system, or an associated local network, may connect to the mobile computing device 110 and relay desired digital proofs and/or attestations to the banking institution 310 and/or the government authority 320. Alternatively, the banking institution 310 and/or the government authority 320 may connect directly to the mobile computing device 110 through a wide-area network such that all information can be verified directly to the user.

Figure 3B:
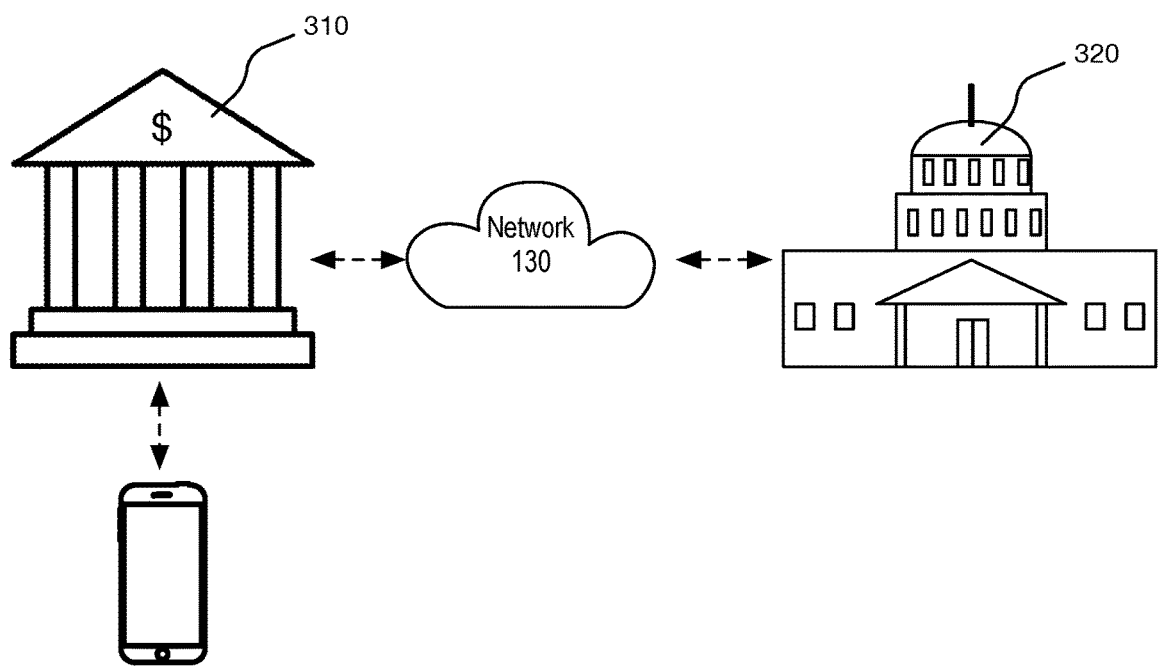
FIG. 3B illustrates a schematic diagram of a user authenticating at a banking institution.

FIG. 3B illustrates a schematic diagram of a user authenticating at a banking institution 310. In this depicted example, a user directly enters a banking institution 310 to open a new account. Once within the banking institution 310, a user is able to leverage digital proofs and/or attestations stored on their mobile computer device 110 to open a new account and/perform various specific transactions. For example, a user may need to authenticate themselves in order to withdraw money over a certain amount (e.g., $10,000). Additionally or alternatively, a user may need to authenticate themselves in order to move money across national borders. In each of these cases, a unique authentication protocol may be required.

Additionally, in at least one embodiment, when opening a new account at the banking institution a user may also request that the new account be validated for specific countries. For example, specific countries may have their own unique user tracking regulations and laws. A user is able to indicate specific countries in which they would like to validate themselves for financial purposes. In response, the banking institution 310 can access security protocols from the specific government authorities 320 indicated by the user. Each government authority 320 may communicate a unique set of authentication protocols that apply within their respective jurisdiction. The user is then able to select on their mobile device which specific digital proofs and/or attestations they would like to the banking institution 310 to store on their behalf and make available to the specific government authorities as needed.

Additionally, in at least one embodiment, each government authority 320 may provide a public key by which the digital proofs and/or attestations can be encrypted. Accordingly, the mobile computing device 110 can encrypt each selected digital proof and/or attestation using the provided public keys. As such, the user can ensure that the digital proofs and/or attestations stored by the banking institution 310 are only readable by the specific governmental authority 320 that the user granted access.

The above-described system provides technical innovations that allow a user to secure and control their own personal data, while also easing the technical requirements for authentication within an increasingly digital financial world. For example, a user can complete control over which information to give to a specific entity. Further, that information is storable in a secure way that also allows for validation as needed by the target entities.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
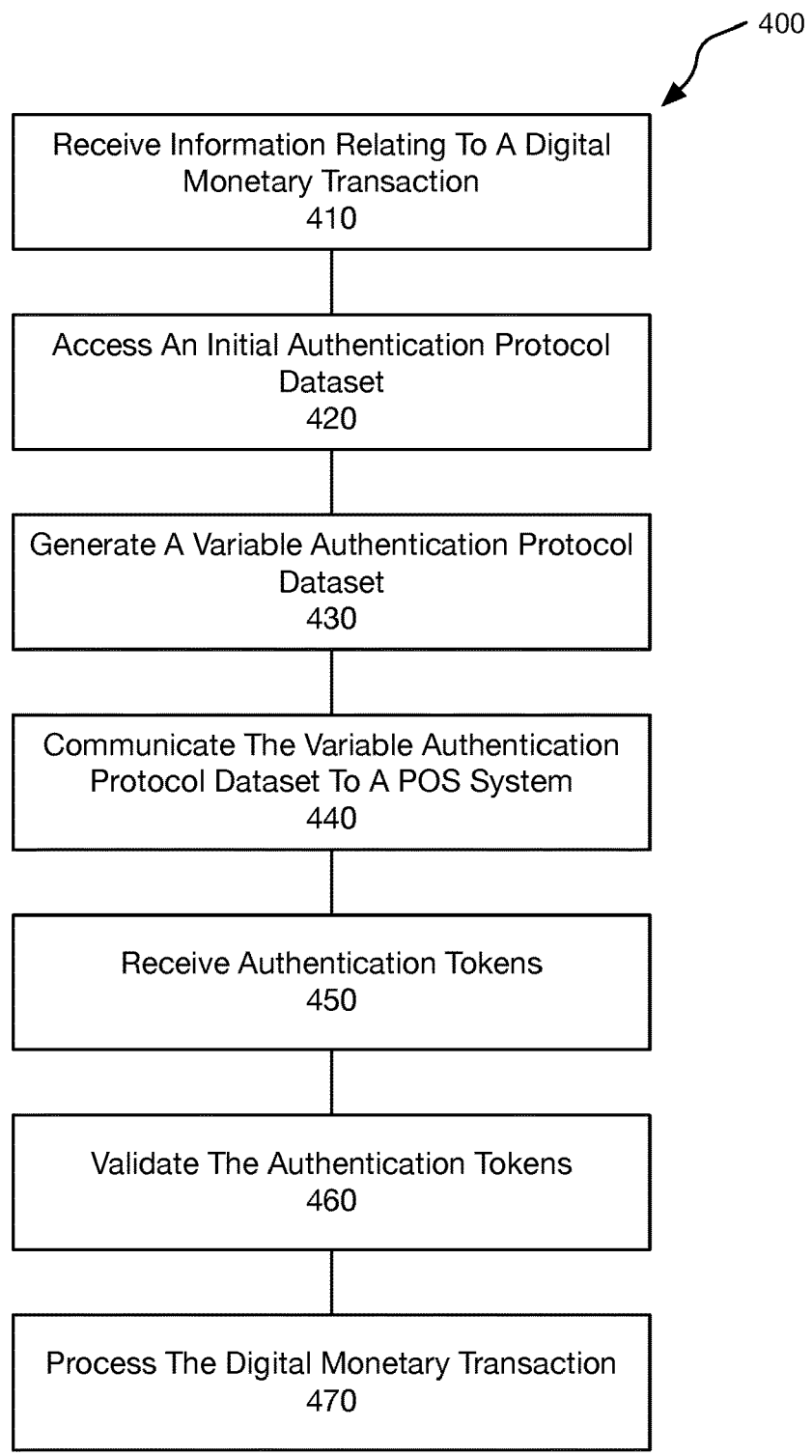
FIG. 4 illustrates a flowchart of an embodiment of a method for implementing and managing network-based, variable authentication protocols.

FIG. 4 illustrates a flowchart of an embodiment of a method 400 for implementing and managing network-based, variable authentication protocols. The method includes an act 410 of receiving, from a point-of-sale computer system, information relating to a digital monetary transaction, an identification associated with a user, an identification associated with the point-of-sale computer system, and location information relating to the point-of-sale computer system. Additionally, the method 400 includes an act 420 of accessing, at the remote variable authentication protocol server, an initial authentication protocol dataset. The initial authentication protocol dataset comprises at least a first authentication protocol associated with the identification associated with the point-of-sale computer system, a second authentication protocol associated with the location information relating to the point-of-sale computer system, and a third authentication protocol associated with the information relating to the digital monetary transaction. The method 400 also includes an act 430 of generating, at the remote variable authentication protocol server, a variable authentication protocol dataset. Generating the remote variable authentication protocol dataset comprises removing from the initial authentication protocol dataset any of the first authentication protocol, the second authentication protocol, or the third authentication protocol that are superseded by another authentication protocol within the initial authentication protocol dataset.

In addition, the method 400 comprises an act 440 of communicating the variable authentication protocol dataset to the point-of-sale computer system. The method 400 also comprises an act 450 of receiving, from the point-of-sale computer system, authentication tokens. Further, the method 400 comprises an act 460 of validating the authentication tokens in view of the variable authentication protocol dataset. Further, still the method 400 comprises an act 470 of, in response to the validation of the authentication tokens, processing the digital monetary transaction.

The attached appendix describes various additional monetary transactions that can be facilitated by embodiments of the present invention. The appendix further describes novel data structures and communication paradigms that can be used to increase the efficiency and security of increasingly complex digital monetary transactions.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, voice-input, etc. for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for network-based, variable authentication protocols, comprising:
   one or more processors; and
   one or more computer-readable media having stored thereon executable instructions that, when executed by the one or more processors, configure the computer system to perform:
   receive, from a point-of-sale computer system, at least:
      information relating to a digital monetary transaction between a mobile device of a user and the point-of-sale computer system,
      an identification associated with the user, wherein the identification is cryptographically signed by the user,
      an identification associated with the point-of-sale computer system, and
      location information relating to the point-of-sale computer system;
   access, at a remote variable authentication protocol server, an initial authentication protocol dataset, wherein the initial authentication protocol dataset comprises at least:
      a first authentication protocol associated with the identification associated with the point-of-sale computer system,
      a second authentication protocol associated with the location information relating to the point-of-sale computer system,
      a third authentication protocol associated with the information relating to the digital monetary transaction, wherein each of the first authentication protocol, the second authentication protocol, and the third authentication protocol comprise a different list of required proofs and attestations;
   generate, at the remote variable authentication protocol server, a variable authentication protocol dataset by removing from the initial authentication protocol dataset any of the first authentication protocol, the second authentication protocol, or the third authentication protocol that are superseded by another authentication protocol within the initial authentication protocol dataset, by:

identifying a requirement for a proof of a particular claim within the first authentication protocol, the second authentication protocol, or the third authentication protocol, identifying a requirement for an attestation of the particular claim within the first authentication protocol, the second authentication protocol, or the third authentication protocol, determining that the attestation supersedes the proof, and removing from the initial authentication protocol dataset the requirement for the proof of the particular claim;

communicate the variable authentication protocol dataset to the point-of-sale computer system;

receive, from the point-of-sale computer system, at least one authentication token, wherein each authentication token comprises at least one proof and/or attestation of identifying information that is encrypted using a public key of a third-party that is requesting the at least one proof and/or attestation;

validate that the at least one authentication token conforms with the variable authentication protocol dataset; and in response to the validation of the at least one authentication token, process the digital monetary transaction.

2. The computer system of claim 1, wherein the first authentication protocol, the second authentication protocol, and the third authentication protocol comprise sovereign identification requirements for specific proof and attestations.

3. The computer system of claim 1, wherein the first authentication protocol associated with the identification associated with the point-of-sale computer system comprises authentication requirements that are specific to a company or organization that operates the point-of-sale computer system.

4. The computer system of claim 1, wherein the second authentication protocol associated with the location information relating to the point-of-sale computer system comprises authentication requirements that are specific to international treaty obligations, national legal obligations, and local law obligations associated with jurisdictions encompassing the point-of-sale computer system.

5. The computer system of claim 1, wherein the third authentication protocol associated with the information relating to the digital monetary transaction comprises authentication requirements that are specific to a type of monetary transaction that is being processed.

6. The computer system of claim 1, wherein the executable instructions include instructions that are executable to configure the computer system to:

receive, at the point-of-sale computer system, a digital request to perform the digital monetary transaction; and communicate, from the point-of-sale computer system to the remote variable authentication protocol server, information relating to the digital monetary transaction, the identification associated with the point-of-sale computer system, and the location information relating to the point-of-sale computer system.

7. The computer system of claim 1, wherein the at least one authentication token comprises claims, proof, and attestations.

8. The computer system of claim 7, wherein the executable instructions include instructions that are executable to configure the computer system to:

communicate the at least one authentication token to a server indicated by the second authentication protocol.

9. A computer-implemented method, executed on one or more processors, for network-based, variable authentication protocols, the computer-implemented method comprising:

receiving, from a point-of-sale computer system, at least:
information relating to a digital monetary transaction between a mobile device of a user and the point-of-sale computer system,
an identification associated with the user, wherein the identification is cryptographically signed by the user,
an identification associated with the point-of-sale computer system, and
location information relating to the point-of-sale computer system;

accessing, at a remote variable authentication protocol server, an initial authentication protocol dataset, wherein the initial authentication protocol dataset comprises at least:
a first authentication protocol associated with the identification associated with the point-of-sale computer system,
a second authentication protocol associated with the location information relating to the point-of-sale computer system, and
a third authentication protocol associated with the information relating to the digital monetary transaction, wherein each of the first authentication protocol, the second authentication protocol, and the third authentication protocol comprise a different list of required proofs and attestations;

generating, at the remote variable authentication protocol server, a variable authentication protocol dataset by removing from the initial authentication protocol dataset any of the first authentication protocol, the second authentication protocol, or the third authentication protocol that are superseded by another authentication protocol within the initial authentication protocol dataset, by:
identifying a requirement for a proof of a particular claim within the first authentication protocol, the second authentication protocol, or the third authentication protocol,
identifying a requirement for an attestation of the particular claim within the first authentication protocol, the second authentication protocol, or the third authentication protocol,
determining that the attestation supersedes the proof, and
removing from the initial authentication protocol dataset the requirement for the proof of the particular claim;

communicating the variable authentication protocol dataset to the point-of-sale computer system;

receiving, from the point-of-sale computer system, at least one authentication token, wherein each authentication token comprises at least one proof and/or attestation of identifying information that is encrypted using a public key of a third-party that is requesting the at least one proof and/or attestation;

validating that the at least one authentication token conforms with the variable authentication protocol dataset; and in response to the validation of the at least one authentication token, processing the digital monetary transaction.

10. The computer-implemented method of claim 9, wherein the first authentication protocol, the second authentication protocol, and the third authentication protocol comprise sovereign identification requirements for specific proof and attestations.

11. The computer-implemented method of claim 9, wherein the first authentication protocol associated with the identification associated with the point-of-sale computer system comprises authentication requirements that are specific to a company or organization that operates the point-of-sale computer system.

12. The computer-implemented method of claim 9, wherein the second authentication protocol associated with the location information relating to the point-of-sale computer system comprises authentication requirements that are specific to international treaty obligations, national legal obligations, and local law obligations associated with jurisdictions encompassing the point-of-sale computer system.

13. The computer-implemented method of claim 9, wherein the third authentication protocol associated with the information relating to the digital monetary transaction comprises authentication requirements that are specific to a type of monetary transaction that is being processed.

14. The computer-implemented method of claim 9, further comprising:
   receive, at the point-of-sale computer system, a digital request to perform the digital monetary transaction; and
   communicate, from the point-of-sale computer system to the remote variable authentication protocol server, information relating to the digital monetary transaction, the identification associated with the point-of-sale computer system, and the location information relating to the point-of-sale computer system.

15. The computer-implemented method of claim 9, wherein the at least one authentication token comprises claims, proof, and attestations.

16. A computer program product comprising one or more computer non-transitory storage media having stored thereon computer-executable instructions that, when executed at a processor, cause a computer system to generate network-based, variable authentication protocols, the computer-executable instructions configured to cause the computer system to:
   receive, from a point-of-sale computer system, at least:
      information relating to a digital monetary transaction between a mobile device of a user and the point-of-sale computer system,
      an identification associated with the user, wherein the identification is cryptographically signed by the user,
      an identification associated with the point-of-sale computer system, and location information relating to the point-of-sale computer system;
   access, at a remote variable authentication protocol server, an initial authentication protocol dataset, wherein the initial authentication protocol dataset comprises at least:
      a first authentication protocol associated with the identification associated with the point-of-sale computer system,
      a second authentication protocol associated with the location information relating to the point-of-sale computer system,
      a third authentication protocol associated with the information relating to the digital monetary transaction, wherein each of the first authentication protocol, the second authentication protocol, and the third authentication protocol comprise a different list of required proofs and attestations;
   generate, at the remote variable authentication protocol server, a variable authentication protocol dataset by removing from the initial authentication protocol dataset any of the first authentication protocol, the second authentication protocol, or the third authentication protocol that are superseded by another authentication protocol within the initial authentication protocol dataset, by:
      identifying a requirement for a proof of a particular claim within the first authentication protocol, the second authentication protocol, or the third authentication protocol,
      identifying a requirement for an attestation of the particular claim within the first authentication protocol, the second authentication protocol, or the third authentication protocol,
      determining that the attestation supersedes the proof, and
   removing from the initial authentication protocol dataset the requirement for the proof of the particular claim;
   communicate the variable authentication protocol dataset to the point-of-sale computer system;
   receive, from the point-of-sale computer system, at least one authentication token, wherein each authentication token comprises at least one proof and/or attestation of identifying information that is encrypted using a public key of a third-party that is requesting the at least one proof and/or attestation;
   validate that the at least one authentication token conforms with the variable authentication protocol dataset; and
   in response to the validation of the at least one authentication token, process the digital monetary transaction.

* * * * *